US010077712B2

(12) United States Patent
Race

(10) Patent No.: US 10,077,712 B2
(45) Date of Patent: Sep. 18, 2018

(54) VENTING SYSTEM FOR A BEARING HOUSING THERMAL DAM OF A TURBOCHARGER

(71) Applicant: BorgWarner Inc., Auburn Hills, MI (US)

(72) Inventor: Robert Thomas Race, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 150 days.

(21) Appl. No.: 15/200,729

(22) Filed: Jul. 1, 2016

(65) Prior Publication Data
US 2018/0003104 A1    Jan. 4, 2018

(51) Int. Cl.
F02B 33/44    (2006.01)
F04B 17/00    (2006.01)
F02B 39/00    (2006.01)
F02B 33/40    (2006.01)
F02B 37/00    (2006.01)

(52) U.S. Cl.
CPC .......... F02B 39/005 (2013.01); F02B 33/40 (2013.01); F02B 37/00 (2013.01)

(58) Field of Classification Search
CPC ........ F02B 39/005; F02B 39/10; F02B 39/14; F02B 33/40; F02B 37/00
USPC ................. 60/605.3; 417/407; 415/111, 56.5
See application file for complete search history.

(56) References Cited

U.S. PATENT DOCUMENTS

| 3,834,156 A * | 9/1974 | Cutler ................ F02B 39/14 417/407 |
| 4,480,440 A * | 11/1984 | Harper ................ F02B 39/14 417/407 |
| 4,704,075 A | 11/1987 | Johnston |
| 4,725,206 A * | 2/1988 | Glaser ................ F02B 39/005 417/407 |
| 4,786,238 A * | 11/1988 | Glaser ................ F02B 39/005 417/407 |
| 5,087,176 A | 2/1992 | Wieland |
| 7,108,488 B2 | 9/2006 | Larue et al. |
| 7,946,118 B2 * | 5/2011 | Hippen ................ F02B 39/10 417/407 |
| 8,287,232 B2 * | 10/2012 | Gu ................ F04D 27/0215 415/56.5 |
| 8,784,036 B2 | 7/2014 | Woollenweber |

(Continued)

FOREIGN PATENT DOCUMENTS

FR    1083716 A    1/1955
WO    WO 98/23886 A1    6/1998

OTHER PUBLICATIONS

A Machine Translation Geratebau Ebrspacher OHG (Pub. No. FR 1 083 716 A), published on Jan. 12, 1955.*

(Continued)

Primary Examiner — Thai Ba Trieu
(74) Attorney, Agent, or Firm — Miller, Matthias & Hull LLP

(57) ABSTRACT

A venting system for a turbocharger may include a bearing housing. The bearing housing may include an inner member. A housing wall may extend from the inner member and may include at least one vent disposed therethrough. A partition may be sealed to the housing wall and the inner member. The partition, the housing wall, and the inner member may collectively form a thermal dam.

15 Claims, 7 Drawing Sheets

(56) References Cited

U.S. PATENT DOCUMENTS

| | | | |
|---|---|---|---|
| 8,807,840 B2* | 8/2014 | House | F01D 25/16 |
| | | | 417/407 |
| 8,814,538 B2 | 8/2014 | House et al. | |
| 9,188,133 B1* | 11/2015 | Richardson | F04D 25/024 |
| 2012/0003081 A1 | 1/2012 | Woollenweber | |
| 2012/0237345 A1 | 9/2012 | Uesugi | |
| 2014/0090375 A1 | 4/2014 | Kanzaka et al. | |
| 2014/0352299 A1* | 12/2014 | Begin | F02B 39/005 |
| | | | 60/605.3 |
| 2015/0337850 A1* | 11/2015 | An | F02B 39/005 |
| | | | 60/605.3 |
| 2015/0369081 A1* | 12/2015 | Takabatake | F02B 39/14 |
| | | | 415/111 |
| 2017/0298761 A1* | 10/2017 | Williams | F02B 33/40 |

OTHER PUBLICATIONS

Machine translation to the reference of Geratebeau Eberspacher OHG (Pub. No. FR 1 083 716 A), published on Jan. 12, 1955.*
International Search Report dated Jun. 28, 2017.
International Search Report for related International Application No. PCT/US2017/039681; dated Jun. 28, 2017.

* cited by examiner

VENTING SYSTEM FOR A BEARING HOUSING THERMAL DAM OF A TURBOCHARGER

FIELD OF DISCLOSURE

The present disclosure relates generally to turbochargers, and more particularly to a venting system for a bearing housing thermal dam of such turbochargers.

BACKGROUND OF DISCLOSURE

Some turbo machines such as, but not limited to, automobiles, trucks, aircraft, locomotives, ships, and auxiliary power generators, utilize a turbocharger, which may increase the internal combustion engine efficiency and power output of such turbo machines. The turbocharger, being a turbine-driven device, may achieve this by forcing extra air into the combustion chamber of the engine. For example, exhaust gas from the engine may drive the turbine of the turbocharger to drive a compressor wheel of the turbocharger compressor, which may draw in ambient air, compress the air, and then supply this extra air to the engine. In this manner, the engine may have improved fuel economy, reduced emissions, and higher power and torque.

The exhaust gas from the engine that flows through the turbine, however, may reach temperatures in excess of 600° C. and may penetrate the adjacent bearing housing. The bearing system housed in the bearing housing, however, may experience undesirable effects, such as overheating of the bearing lubrication oil or fluid, when exposed to such temperatures. As such, efforts have been made to reduce exposure of such temperatures to the bearing system. For example, some traditional turbochargers employ a cooling jacket for circulating engine coolant, via the engine, through the bearing housing to cool the bearing system and other internal structural parts of the turbocharger.

Another example may be found in U.S. Pat. No. 8,784, 036 ('036 patent), which discloses a cooling system for a turbocharger that utilizes air bled from the compressor into the cooling jacket instead of engine coolant. While arguably effective for its intended purpose, the cooling system of the '036 patent fails to address cooling the bearing housing adjacent the turbine, which may be exposed to elevated exhaust gas temperatures circulating therefrom.

SUMMARY OF DISCLOSURE

In accordance with an aspect of the disclosure, a venting system for a turbocharger is provided. The venting system may include a bearing housing including an inner member. A housing wall may extend from the inner member and may include at least one vent disposed therethrough. A partition may be sealed to the housing wall and the inner member. The partition, the housing wall, and the inner member may collectively form a thermal dam.

In accordance with another aspect of the disclosure, a turbocharger is provided. The turbocharger may include a turbine housing and a compressor housing including a diffuser. A bearing housing may be disposed between the turbine housing and the compressor housing. The bearing housing may include a housing wall and an inner member. The housing wall may extend from the inner member at an intersection and may terminate at a shoulder rim. The shoulder rim may be spaced radially outwardly from the inner member and may be axially offset with respect to the intersection. A partition may include a face, an annular wall extending from the face, and a flange extending radially outwardly from the annular wall and sealed to the inner member. The partition, the housing wall, and the inner member may collectively form a thermal dam. The housing wall may include at least one vent disposed therethrough.

In accordance with yet another aspect of the disclosure, a sample sequence of steps for a method for cooling a thermal dam of a bearing housing in a turbocharger is provided. The method entails providing at least one vent through a housing wall of the bearing housing. Another step may be positioning an actuator through the housing wall of the bearing housing. Yet another step may be determining whether air should be supplied to the thermal dam. Still another step may be selectively actuating the actuator to supply air to the thermal dam. An even further step may be providing a tubing coupled in-line with the actuator.

These and other aspects and features of the present disclosure may be better appreciated by reference to the following detailed description and accompanying drawings.

It should be understood that the drawings are not to scale, and that the disclosed embodiments are illustrated only diagrammatically and in partial views. It should also be understood that this disclosure is not limited to the particular embodiments illustrated herein.

DETAILED DESCRIPTION

Figure 1:
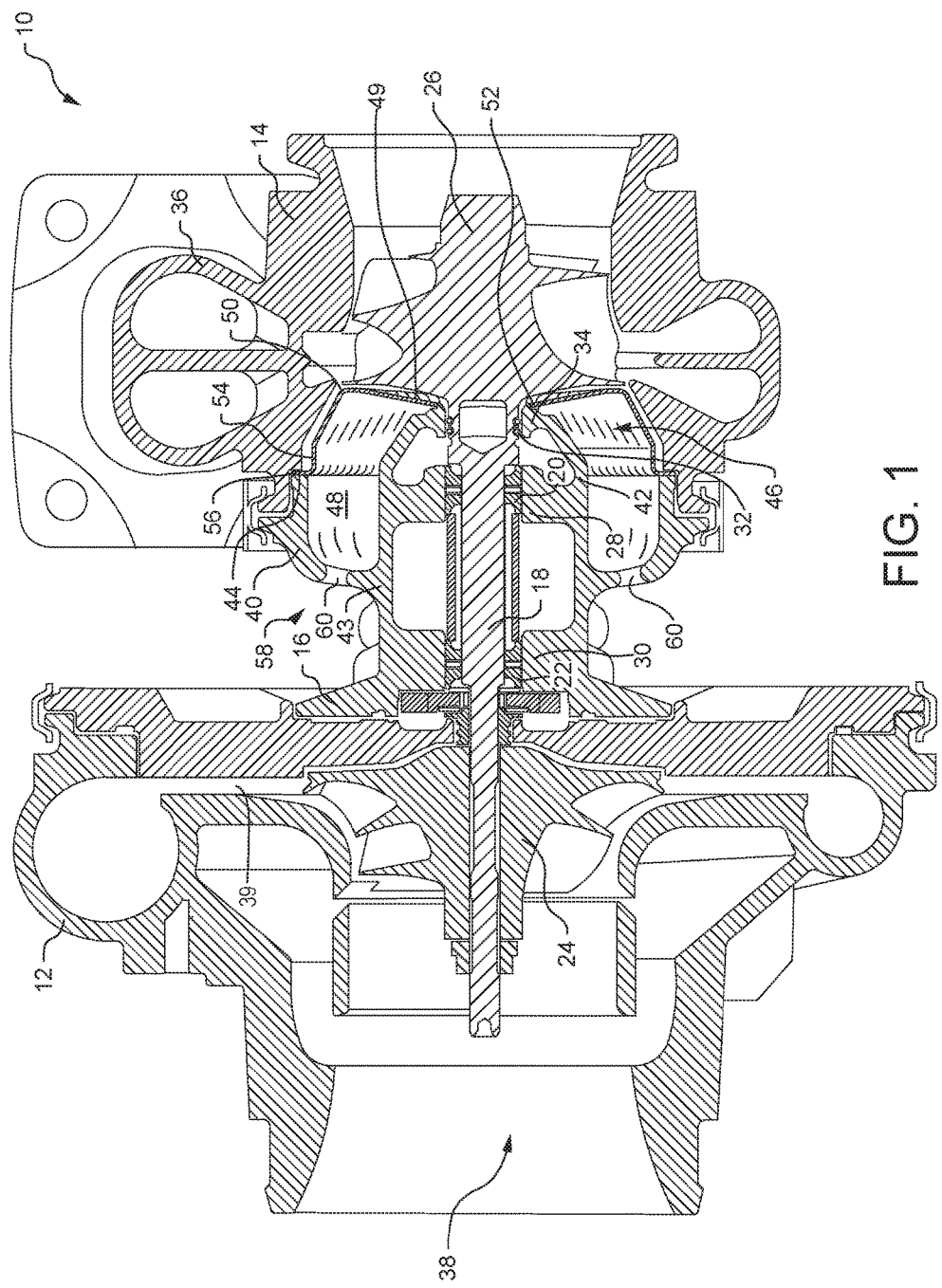
FIG. 1 is a cross-sectional view of an exemplary turbocharger, in accordance with an embodiment of the present disclosure.

Referring now to FIG. 1, an exemplary turbocharger constructed in accordance with the present disclosure is generally referred to by reference numeral 10. The turbocharger 10 may be utilized in conjunction with an internal combustion engine of a turbo machine (not shown) such as, but not limited to, an automobile, a truck, an aircraft, a locomotive, a ship, and an auxiliary power generator. The turbocharger 10 may increase the power output of such engines by extracting power from the exhaust gases of the engine to compress the air to be delivered to the air intake of the engine such that the compressed air may mix with fuel and be burned in the engine. The turbocharger 10 includes a compressor housing 12, a turbine housing 14, and a bearing housing 16 arranged between the compressor housing 12 and the turbine housing 14. A shaft 18 is rotatably mounted, via first and second bearings 20, 22, in the bearing housing 16. A compressor wheel 24 is mounted on the shaft 18 and arranged in the compressor housing 12. The compressor wheel 24 may be rotatably driven via the shaft 18 by a turbine wheel 26 mounted on an opposite end of the shaft 18 and arranged in the turbine housing 14.

The first bearings 20 are disposed between the shaft 18 and a first bearing cradle 28 of the bearing housing 16. As the first bearing cradle 28 may be arranged toward the turbine wheel 26, it may also be referred to as the turbine-side bearing cradle. The second bearings 22 are disposed between the shaft 18 and a second bearing cradle 30 of the bearing housing 16. The second bearing cradle 30 is axially spaced from the first bearing cradle 28 toward the compressor wheel 24 and may also be referred to as the compressor-side bearing cradle. Piston rings 32 are disposed between the shaft 18 and a piston ring cradle 34 of the bearing housing 16. The piston ring cradle 34 is axially spaced from the first bearing cradle 28 towards the turbine wheel 26 such that it is disposed therebetween.

The turbine housing 14 includes a volute 36, which may deliver exhaust gas from an internal combustion engine (not shown) to the turbine wheel 26. The exhaust gas may cause the turbine wheel 26 to rotate and drive the compressor wheel 24 to draw ambient air into an air inlet 38 of the compressor housing 12, which is compressed and then directed through a diffuser 39 of the compressor housing 12 to the internal combustion engine.

Figure 2:
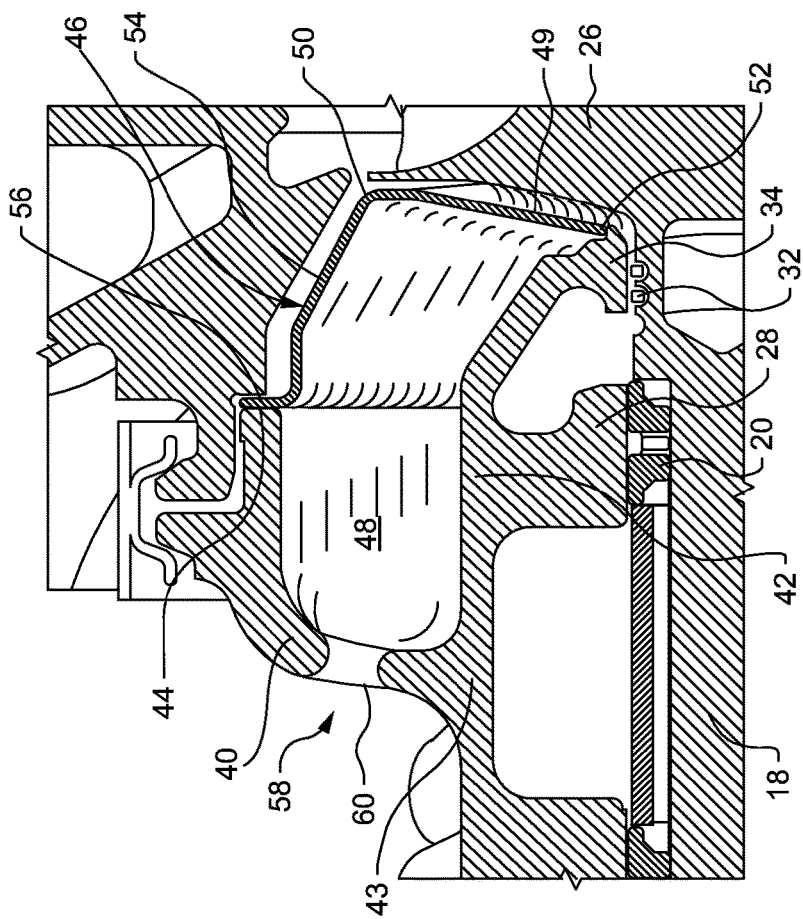
FIG. 2 is an enlarged perspective view of the exemplary turbocharger of FIG. 1, in accordance with an embodiment of the present disclosure.

With reference to FIGS. 1 and 2, the bearing housing 16 further includes a housing wall 40. The housing wall 40 may have an arcuate shape that extends from an inner member 42 of the bearing housing 16 at intersection 43 and terminates at a shoulder rim 44 such that the shoulder rim 44 is spaced radially outwardly from the inner member 42 and is axially offset with respect to the intersection 43. Both the first bearing cradle 28 and the piston ring cradle 34 may extend radially inwardly from the inner member 42 of the bearing housing 16. With a partition 46 sealed to the shoulder rim 44 and to the inner member 42 proximate the piston ring cradle 34, a thermal dam 48 is defined by the volume collectively formed by the housing wall 40, the inner member 42, and the partition 46.

Figure 3:
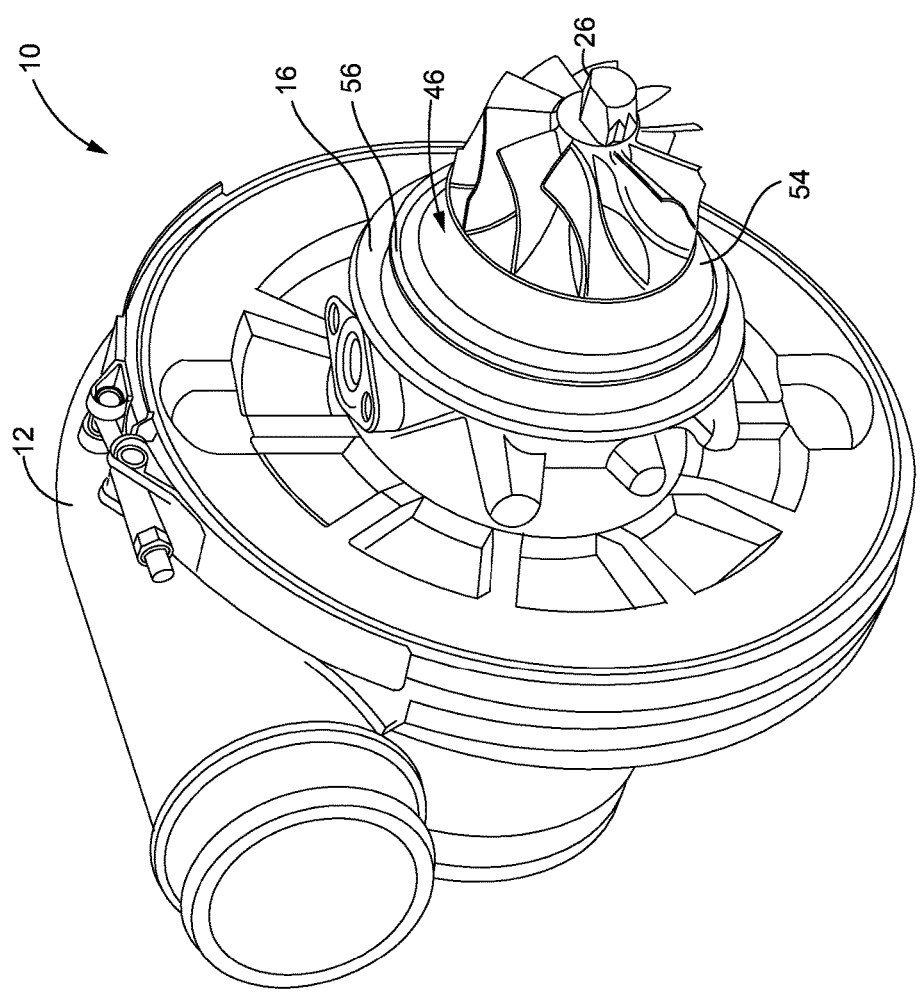
FIG. 3 is a cross-sectional view of an exemplary turbocharger with the turbine housing removed to illustrate an exemplary partition, in accordance with an embodiment of the present disclosure.

Referring now to FIGS. 1-3, the partition 46 may include a face 49 having a generally circular shape and an outer diameter 50. The face 49 may include an inner edge 52 disposed centrally therethrough that has a generally circular shape. The partition 46 may also include an annular wall 54 extending axially from the outer diameter 50 of the face 49. A flange 56 may extend radially outwardly from the annular wall 54 such that the annular wall 54 is disposed between the flange 56 and the face 49. In some embodiments, the partition 46 may be formed of sheet metal. In other embodiments, the partition 46 may be a heat shield formed of any material well known in the industry that limits or reduces heat transfer.

The inner edge 52 of the face 49 may be sealed to the inner member 42 proximate the piston ring cradle 34 by adhesive, welding, or any other manner well known in the industry. Similarly, the flange 56 may be sealed to the shoulder rim 44 by adhesive, welding, or any other manner well known in the industry.

Figure 4:
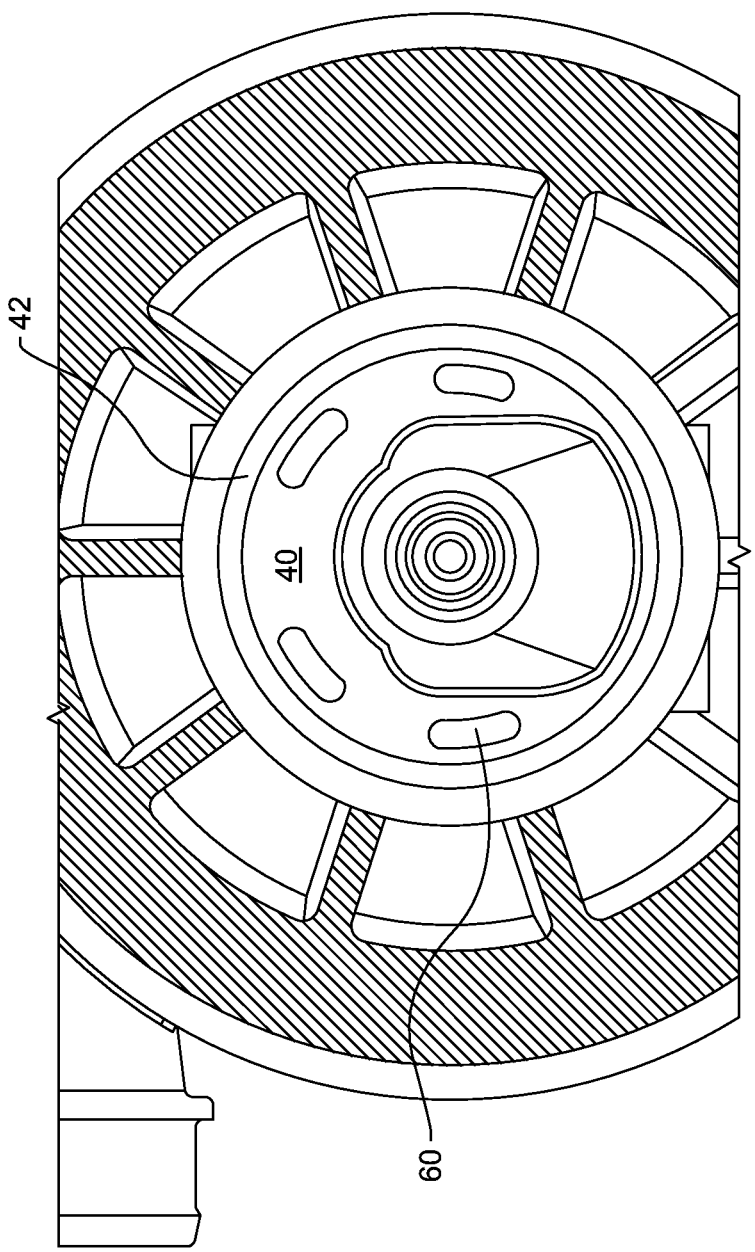
FIG. 4 is a plan view of an exemplary turbocharger with parts removed to illustrate a plurality of vents of a venting system, in accordance with an embodiment of the present disclosure.

With particular reference to FIGS. 1-2 and 4, the turbocharger 10 may also include a venting system 58. The venting system 58 may include at least one vent 60 disposed through the housing wall 40 of the bearing housing 16. In some embodiments, the at least one vent 60 may be cast or machined in the housing wall 40. The at least one vent 60 may be strategically sized and arranged to optimize venting of the thermal dam 48 by allowing cooler ambient air to enter the thermal dam 48 while allowing the air already in the thermal dam 48 to vent outwardly therefrom. Moreover, although four vents 60 are illustrated in FIG. 4, the venting system 58 is not limited to four vents and may include fewer vents or more vents to optimize venting of the thermal dam 48.

Figure 5:
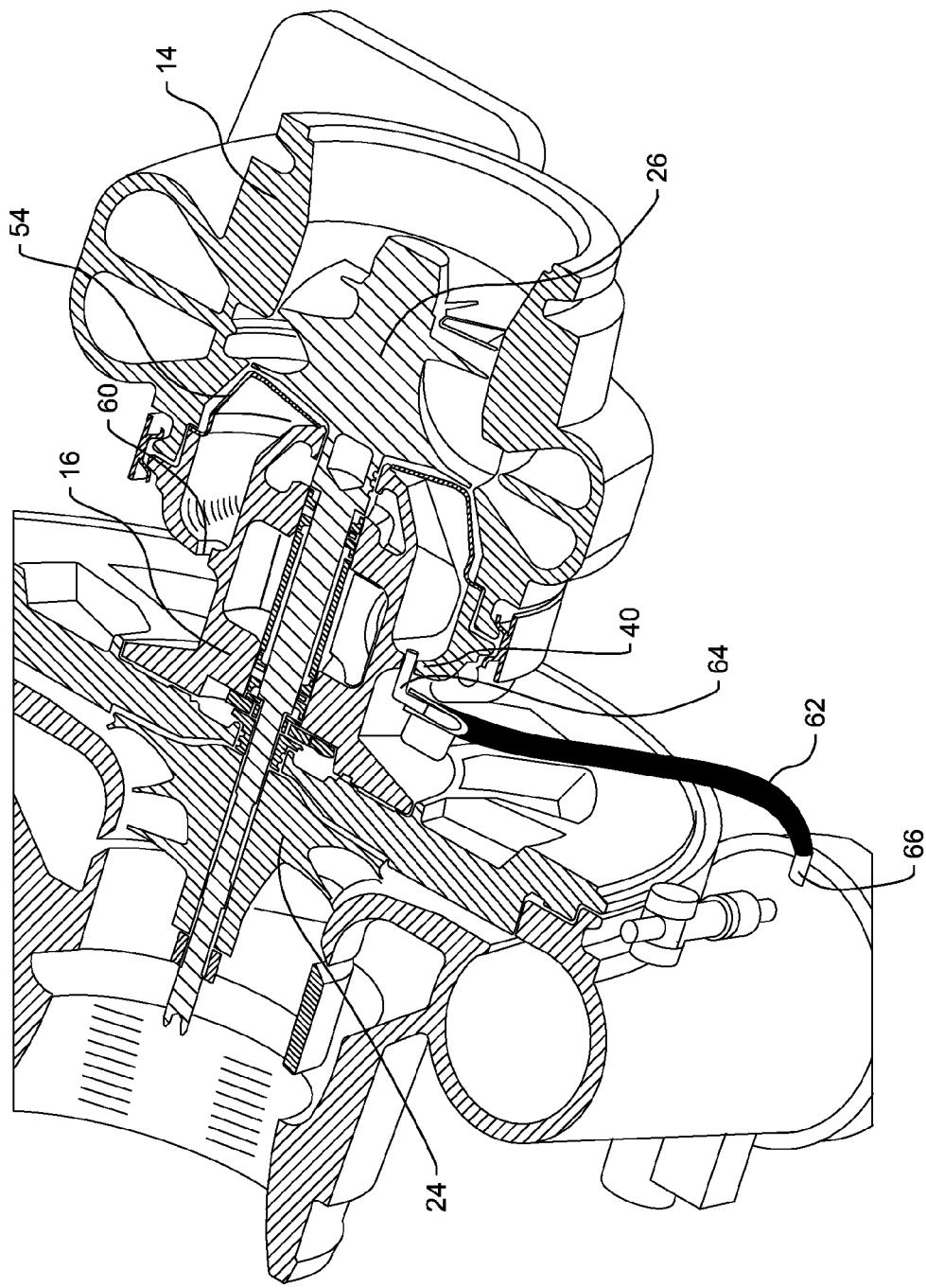
FIG. 5 is perspective view of an exemplary turbocharger, with portions sectioned and broken away, in accordance with an embodiment of the present disclosure.

In an alternative embodiment illustrated in FIG. 5, the venting system 58 may further include a tubing 62, hose, or other conduit in fluid communication with the thermal dam 48 via a bearing housing fitting 64 disposed through the housing wall 40 of the bearing housing 16. The other end of the tubing 62 may be in fluid communication with the diffuser 39 of the compressor housing 12 via a compressor housing fitting 66 disposed through the compressor housing 12 such that pressurized air therefrom is fed through the tubing 62 to the thermal dam 48. In this manner, the tubing 62 may fluidly couple the thermal dam 48 to the diffuser 39. The bearing housing fitting 64 and the compressor housing fitting 66 may be pressed-in fittings, threaded fittings, or any other type of fittings well known in the industry. The at least one vent 60 may be disposed through the housing wall 40 of the bearing housing 16 at a location that is diametrically opposed to bearing housing fitting 64. Although the at least one vent 60 is illustrated as one vent, the at least one vent 60 may include multiple vents strategically arranged through the housing wall 40.

Figure 6:
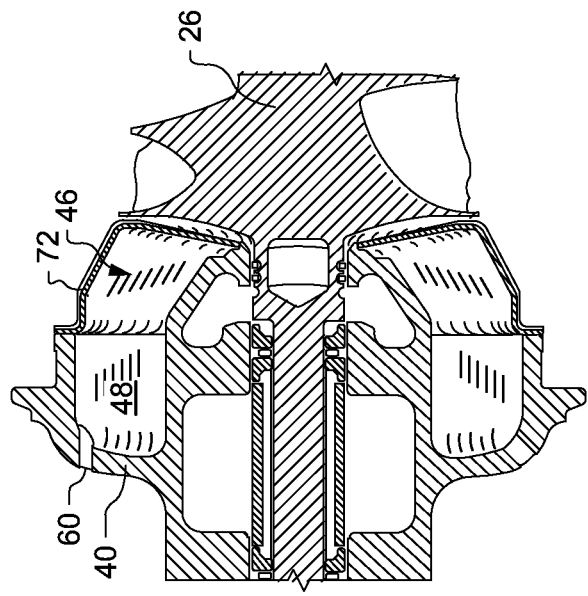
FIG. 6 is a cross-sectional view of an exemplary turbocharger illustrating an actuator of the venting system, in accordance with an embodiment of the present disclosure.

In another alternative embodiment illustrated in FIG. 6, the venting system 58 may further include an actuator 68, such as but not limited to a solenoid, coupled in-line with the tubing 62. The actuator 68 may be press fit, threaded, or tapped into the housing wall 40 of the bearing housing 16. In some embodiments, the actuator 68 may be disposed through the housing wall 40 of the bearing housing 16 at a location that is diametrically opposed to the at least one vent 60. The actuator 68 may selectively regulate and supply the pressurized air from the compressor housing 12, via the tubing 62, into the thermal dam 48 and out the at least one vent 60. In other embodiments, the tubing 62 may be excluded from the venting system 58 such that the actuator 68 selectively regulates and supplies ambient air into the thermal dam 48 instead. In some embodiments, the actuator 68 may be in communication with a processor 70, which is configured to selectively regulate and supply air flow into the thermal dam 48.

Figure 7:
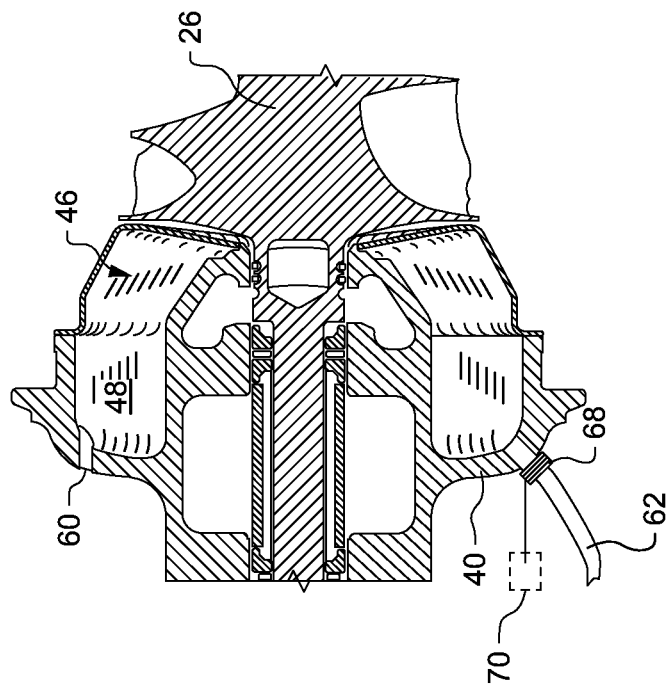
FIG. 7 is a cross-sectional view of an exemplary turbocharger illustrating a heat shield, in accordance with an embodiment of the present disclosure.

As illustrated in FIG. 7, some embodiments, in which the partition 46 is formed of sheet metal, may further include a heat shield 72. The heat shield 72 may have a shape that generally corresponds to the shape of the partition 46 such that the heat shield 72 is disposed adjacent the partition 46 for shielding the partition 46 from the exhaust gas. The heat shield 72 may be formed of any material well known in the industry that limits or reduces heat transfer.

Figure 8:
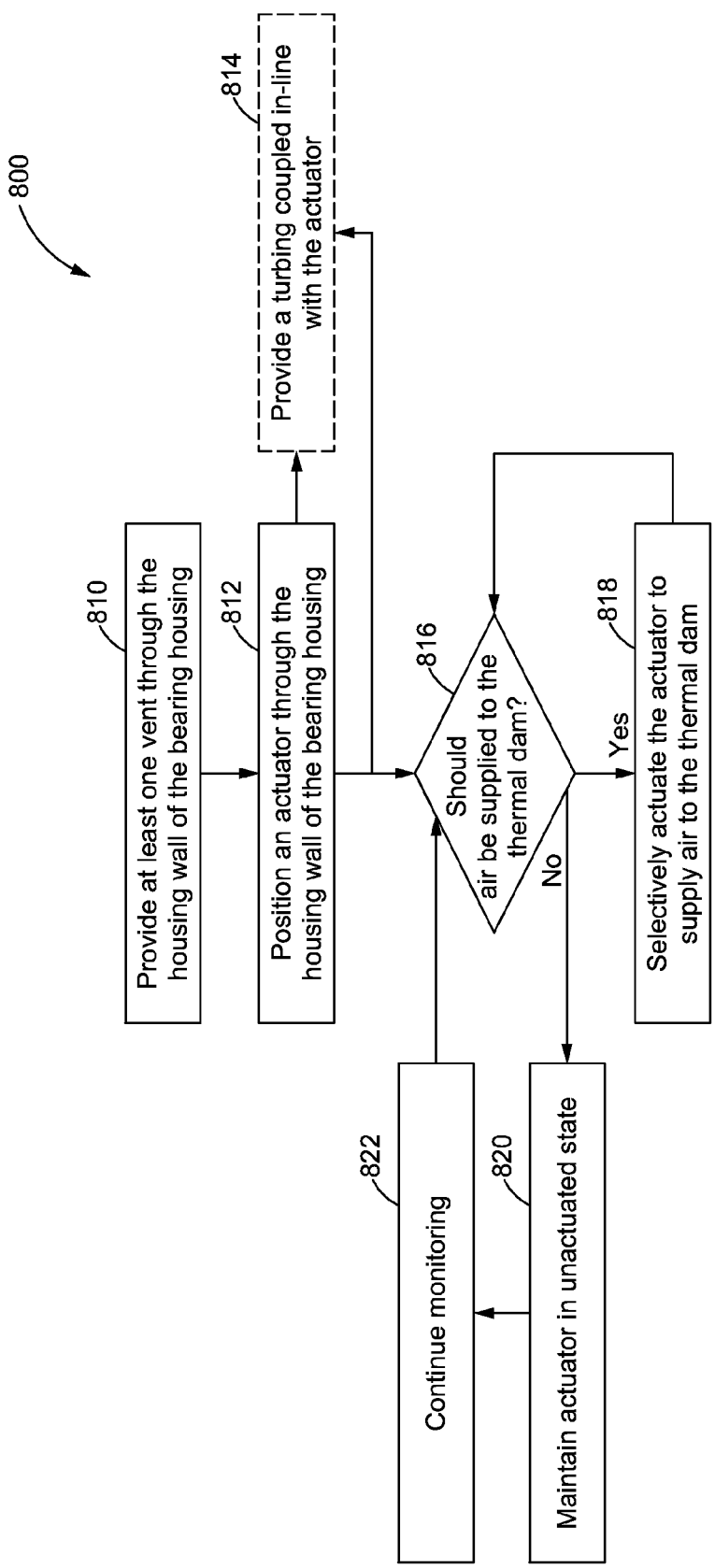
FIG. 8 is a flow chart illustrating a sample sequence of steps which may be practiced in accordance with the teachings of the present disclosure.

FIG. 8 illustrates a flow chart 800 of a sample sequence of steps which may be performed to cool a thermal dam of a bearing housing in a turbocharger. The method may begin at a box 810, which illustrates the step of providing at least one vent 60 through the housing wall 40 of the bearing housing 16 to thereby form a flow path between the thermal dam 48 and the ambient air. At another step, as illustrated in box 812, an actuator 68 may then be positioned through the housing wall 40 of the bearing housing 16. An alternative step, as illustrated in box 814, may be providing a tubing 62 coupled in-line with the actuator 68 for fluidly communicating pressurized air from the compressor housing 12 to the thermal dam 48.

Moving along, decision box 816 illustrates the step of determining whether air (i.e. pressurized air or ambient air) should be supplied to the thermal dam 48 for venting thereof. When it is determined that air should be supplied to the thermal dam 48, the actuator 68 may be selectively actuated to continuously or intermittently supply air to the thermal dam 48, as illustrated in box 818. As a non-limiting example, during shutdown of a vehicle, the actuator 68 may be selectively actuated to supply ambient air to the thermal dam 48 for reducing heatsoak into the turbocharger 10. When it is determined, on the other hand, that air should not be supplied to the thermal dam 48, the actuator 68 may remain unactuated, as illustrated in box 820, and monitoring may continue, as illustrated in box 822, so that another determination may be made. Similarly, after the actuator 68 has been selectively actuated to supply air to the thermal dam 48, another determination may be made as to whether the actuator 68 should be selectively actuated.

INDUSTRIAL APPLICABILITY

Based on the foregoing, it can be seen that the present disclosure can find applicability in many industries such as but not limited to those employing an internal combustion engine in various turbo machines such as, but not limited to, automobiles, trucks, aircraft, locomotives, ships, and auxiliary power generators. Through the novel teachings set forth above, the venting system 58 of the turbocharger 10 provides venting and cooling of the thermal dam 48, which may limit heat transfer to the bearing housing 16 and may reduce convection as a result of the thermal dam 48 being isolated from the exhaust gas stream of an engine and being ventilated. Moreover, the present disclosure may provide a reduction in parts, and in turn reduce parts and labor costs, as a separate insulation pack may not be required in the thermal dam 48.

In operation of the turbocharger 10, the turbine wheel 26 is driven by the exhaust gas flowing from the internal combustion engine through the volute 36 of the turbine housing 14. Rotation of the turbine wheel 26 drives the compressor wheel 24 via the shaft 18. As the compressor wheel 24 rotates, ambient air is drawn into the air inlet 38, pressurized, and directed through the compressor housing 12 to the internal combustion engine. While the exhaust gas directed to the turbine wheel 26 from the internal combustion engine may be in excess of 600° C. in some applications, the partition 46 shields the first bearings 20 and the piston rings 32 from such exhaust gas. In particular, with the flange 56 of the partition 46 sealed to the shoulder rim 44 of the bearing housing and the inner edge 52 of the partition 46 sealed to the inner member 42 proximate the piston ring cradle 34, the thermal dam 48 is isolated from the exhaust stream by the partition 46 such that heat transfer to the bearing housing 16 via convection is prevented. In this manner, the thermal dam 48 may also limit conduction into the bearing housing 16.

Moreover, in some embodiments, the at least one vent 60 of the venting system 58 allows the air within the thermal dam 48 to vent outwardly to the ambient air. In other embodiments, the actuator 68 of the venting system 58 may be selectively actuated to regulate and supply ambient air, or pressurized air from the compressor housing 12 via tubing 62, directly into the thermal dam 48 such that the air within the thermal dam 48 may be purged out through the at least one vent 60. The venting system 58 may cool the thermal dam 48 such that temperatures proximate the first bearing cradle 28 and the piston ring cradle 34 of the bearing housing 16, and the first bearings 20 and piston rings 32 in particular, may be decreased during operation as well as during hot shutdown as heatsoak may also be decreased.

What is claimed is:

1. A venting system for a turbocharger including a compressor housing and a turbine housing, the venting system comprising:
    a bearing housing disposed between the compressor housing and the turbine housing, the bearing housing including an inner member;
    a bearing housing wall extending from the inner member, the bearing housing wall including a plurality of vents disposed therethrough; and
    a partition sealed to the bearing housing wall and the inner member, the partition, the bearing housing wall, and the inner member collectively forming a thermal dam;
        wherein the partition prevents airflow between the thermal dam and the turbine housing of the turbocharger;
        wherein the plurality of the vents are situated in the bearing housing wall between the compressor housing and turbine housing of the turbocharger; and
        wherein the plurality of the vents allow ambient airflow into and out of the thermal dam.

2. The venting system of claim 1, further including an actuator disposed through the bearing housing wall.

3. The venting system of claim 2, wherein the actuator is disposed through the bearing housing wall at a location that is diametrically opposed from one the plurality of the vents.

4. The venting system of claim 1, wherein the partition further includes a face including an inner edge disposed therethrough, an annular wall extending axially from an outer diameter of the face, and flange extending radially outwardly from the annular wall.

5. The venting system of claim 4, wherein the inner edge is sealed to the inner member and the flange is sealed to a shoulder rim of the bearing housing wall.

6. A turbocharger, comprising:
    a turbine housing;
    a compressor housing including a diffuser;
    a bearing housing disposed between the turbine housing and the compressor housing, the bearing housing including a housing wall and an inner member, the housing wall extending from the inner member at an intersection and terminating at a shoulder rim, the shoulder rim spaced radially outwardly from the inner member and axially offset with respect to the intersection; and
    a partition including a face, an annular wall extending axially from the face, and a flange extending radially outwardly from the annular wall and sealed to the shoulder rim, the face including an inner edge disposed therethrough, the inner edge sealed to the inner member, wherein the partition, the housing wall, and the inner member collectively form a thermal dam, and wherein the housing wall includes vents disposed therethrough;
        wherein the partition blocks airflow between the thermal dam and the turbine housing of the turbocharger;
        wherein the vents are situated in the housing wall between the compressor housing and turbine housing of the turbocharger; and wherein the vents allow ambient airflow into and out of the thermal dam.

7. The turbocharger of claim 6, further including a tubing fluidly coupling the thermal dam to the diffuser of the compressor housing.

8. The venting system of claim 7, wherein the actuator is in communication with a processor configured to selectively regulate and supply air into the thermal dam to reduce temperatures during a hot shutdown to decrease heatsoak.

9. The turbocharger of claim 7, wherein the tubing is in fluid communication with the thermal dam via a bearing housing fitting disposed through the housing wall and the tubing is in fluid communication with the diffuser of the compressor housing via a compressor housing fitting disposed through the compressor housing.

10. The turbocharger of claim 6, further including an actuator disposed through the housing wall.

11. The turbocharger of claim 10, wherein the actuator is coupled in-line to a tubing in fluid communication with the diffuser of the compressor housing via a compressor housing fitting disposed through the compressor housing.

12. The turbocharger of claim 11, wherein the actuator is in communication with a processor configured to selectively regulate and supply air from the diffuser into the thermal dam.

13. The turbocharger of claim 6, further including a heat shield disposed adjacent the partition.

14. A method for cooling a thermal dam of a bearing housing in a turbocharger, the turbocharger including a compressor housing having a diffuser; the method comprising:
providing a tubing fluidly coupling the thermal dam to the diffuser of the compressor housing:
providing at least one vent through a housing wall of the bearing housing;
positioning an actuator through the housing wall of the bearing housing;
determining whether air should be supplied to the thermal dam; and
selectively actuating the actuator to supply air to the thermal dam to reduce temperatures during a hot shutdown to decrease heatsoak.

15. The method of claim 14, further including providing the tubing to be coupled in-line with the actuator.

* * * * *